United States Patent [19]

Willard

[11] Patent Number: 4,698,230

[45] Date of Patent: Oct. 6, 1987

[54] POTATO FLAVOR ENHANCING COMPOSITION AND METHOD OF USE

[76] Inventor: Miles J. Willard, 949 E. 17th St., Idaho Falls, Id. 83402

[21] Appl. No.: 899,977

[22] Filed: Aug. 25, 1986

Related U.S. Application Data

[63] Continuation-in-part of Ser. No. 851,894, Apr. 9, 1986, abandoned, which is a continuation of Ser. No. 602,738, Apr. 23, 1984, abandoned.

[51] Int. Cl.$^4$ .......................... A23L 1/22; A23L 1/216
[52] U.S. Cl. .................................... 426/533; 426/637; 426/650
[58] Field of Search ................ 426/533, 637, 650, 550

[56] References Cited

U.S. PATENT DOCUMENTS

| | | |
|---|---|---|
| 3,282,704 | 11/1966 | Fritzberg . |
| 3,495,994 | 2/1970 | Kwiat et al. . |
| 3,501,315 | 3/1970 | Slakis et al. . |
| 3,594,187 | 7/1971 | Liepa . |
| 3,619,211 | 11/1971 | Chang et al. . |
| 3,666,494 | 5/1972 | Bentz et al. . |
| 3,772,039 | 11/1973 | Guadagni et al. . |
| 3,814,818 | 6/1974 | Chang et al. . |
| 3,829,582 | 8/1974 | Guadagni et al. . |
| 3,857,982 | 12/1974 | Sevenants . |
| 3,998,975 | 12/1976 | Liepa .............................. 426/637 X |
| 4,167,588 | 9/1979 | Willard . |
| 4,263,332 | 4/1981 | Withycombe et al. . |

FOREIGN PATENT DOCUMENTS 871648 5/1971 Canada .

*Primary Examiner*—Arthur L. Corbin
*Attorney, Agent, or Firm*—Hopkins, French, Crockett, Springer & Hoopes

[57] ABSTRACT

A non-volatile potato flavor enhancing composition is added to processed potatoes to provide a natural potato flavor. The flavor enhancer comprises a sugar component, an acidic component provided by at least one acid naturally present in the potato, a metallic flavor component provided by at least one salt of a metal naturally present in a potato, and a bitter flavor component provided by potato solids heated in air at a sufficiently high temperature and for a sufficient length of time to cause browning of the potatoes to the extent that a bitter flavor potato component is produced. The flavor enhancer is used for improving the flavor of processed potatoes such as dehydrated mashed potatoes, fabricated potato snacks, has brown potato patties, and the like. The flavor enhancer produces a complete fresh potato flavor profile in the finished product without any of the flavor constitutents being evaporated or altered during subsequent processing, such as heating at elevated temperatures, frying, reconstitution; or during subsequent storage.

59 Claims, No Drawings

POTATO FLAVOR ENHANCING COMPOSITION AND METHOD OF USE

CROSS-REFERENCE TO RELATED APPLICATION

This is a continuation-in-part of application Ser. No. 851,894, filed Apr. 9, 1986, now abandoned, which is a continuation of application Ser. No. 602,738, filed Apr. 23, 1984, now abandoned.

BACKGROUND OF THE INVENTION

This invention relates to a potato flavor enhancing composition principally used to produce a more natural potato flavor in food products prepared from processed potatoes.

The use of potatoes in processed form continues to grow worldwide. Regardless of the widespread popularity of the many frozen, dehydrated and otherwise preserved food products, manufacturers are constantly attempting to improve the flavor and public acceptance of these products. The flavor of freshly prepared potato products is far superior to the flavor of potato products made from processed potatoes which are generally characterized by their bland flavor. French fried potatoes made from frying raw potatoes, as opposed to processed potatoes, have a unique and highly desirable fresh potato flavor.

In the past, there have been numerous attempts to duplicate the flavor of a freshly fried natural French fried potato. These attempts have included laboratory preparation of numerous synthetic organic flavoring agents or vegetable-based flavoring agents for being added to processed potatoes to enhance their flavor. Other attempts have included modification of various techniques in the processing of potatoes. Several of these prior art processes are described below. Despite all of these prior attempts, a natural potato flavor enhancing composition for use in processed potatoes has not been produced.

The flavor differences between freshly prepared potato products and those that have been processed are caused by many factors. These include the loss of soluble constituents in water used in the processing; changes caused by interaction of flavor components during high temperature treatment, such as blanching, mixing, and particularly dehydration; losses during storage life of the product after processing; and the development of off-flavors during storage life.

Previous attempts at preparing potato products with improved flavor have been described in many patents. British Pat. No. 1,420,505 to Purves et al. describes processing of potatoes with a minimum loss of water soluble ingredients. In a dehydrated mashed potato flake process, the standard steps of precooking and cooling, which are normally carried out in water, are eliminated to produce a more natural flavor in snacks made from the flakes. U.S. Pat. No. 3,397,993 to Strong describes techniques for greatly reducing the blanching required to make frozen French fries. U.S. Pat. No. 3,862,845 to Westover describes a process for making potato flakes in which the potatoes are not peeled to achieve better flavor.

The flavor of processed potatoes also has been enhanced by addition of various natural ingredients and plant materials. U.S. Pat. No. 3,594,187 to Liepa describes a process where the flavor of products prepared from dehydrated potatoes is improved by adding a flavoring agent selected from plants of the Cruciferea family. The process disclosed in Canadian Pat. No. 871,648 to Liepa attempts to achieve the same result by adding ascorbic acid.

A large number of organic flavoring agents also have been developed for the purpose of imparting various types of potato flavor to potatoes and other food products. Some of these are intended to restore the original "earthy" flavor constituents in potatoes. Others focus on the use of pyrazine derivatives, inasmuch as pyrazine flavor constituents are largely responsible for the characteristic aroma and flavor of natural baked or fried potatoes. In the prior art, there are at least about 50 known potato flavoring agents available in powder or liquid form. Examples of such chemical flavoring agents are described in U.S. Pat. Nos. 3,501,315 to Slakis et al.; 3,619,211 and 3,814,818 to Chang et al.; 3,772,039 and 3,829,582 to Guadagni et al.; 3,666,494 to Bentz et al.; and 4,263,332 to Withycombe et al. These chemical flavoring agents typically have been demonstrated in food products that require no further processing. For example, these flavoring agents have been added to mashed potatoes and potato chips after each of these food products is prepared. In other instances, the flavoring ingredients are added to oil in which the potato products are fried, rather than being added to the product itself. It has been my experience that when such chemical flavor additives are added to a potato-based intermediate product which is later shaped and fried, and possibly frozen and later reheated, the chemical flavoring is either volatilized (disappears) or is greatly altered by the subsequent processing, such that the flavor of the finished product either is not improved or develops an objectionable flavor totally unrelated to natural potato flavor.

Potato solids also have been heated and added to a potato product to impart a scorched or baked flavor to the product. For example, U.S. Pat. No. 3,282,704 to Fritzberg discloses a process in which potato flakes are toasted and added to a dough which is extruded and fried to form a French fry with improved texture and flavor. Fritzberg adds the toasted potato flakes at a level from 50% to 100% by weight of the dehydrated mashed potato in the French fry mixture to achieve the texture and flavor improvements. U.S. Pat. No. 4,122,198 to Wisdom discloses heat-treating a minor portion of the surface of a dough product prior to frying to give the finished product a toasted flavor. U.S. Pat. No. 3,857,982 to Sevenants describes a process for producing baked potato flavor from fresh potatoes or fried potato chips made from raw potatoes or dehydrated potatoes and raw slices. The potato material is then pulverized, extracted and concentrated and used to enhance the flavor of potato chips. The process involves solvent extraction of the flavor ingredients and contacting the extract with a cation-exchange resin. Pyrazine compounds are separated from the cation-exchange resin and then can be added to the dough for making potato chips. U.S. Pat. No. 4,167,588 to Willard discloses a process for making a fabricated baked potato product in which an outer layer of dough encloses a core of mashed potatoes. The product is then fried and frozen. Cut pieces of potatoes are baked and optionally dried for use as a flavoring ingredient in the outer dough layer. In addition, potato flakes can be toasted at a temperature of 250° F., as described by Fritzberg, and later reconstituted with water to form the outer layer of the baked potato product.

The present invention provides a potato flavor enhancing composition that produces a more natural potato flavor for processed potato products than has been possible with the flavor ingredients or flavor enhancement techniques of the prior art. The flavor enhancing composition of this invention can be added to processed potatoes and/or used in potatoes that undergo further processing after the flavor enhancer is added, or it can be added to the water of hydration used for reconstituting dehydrated potato pieces; and yet the flavor imparted is not volatilized or altered by subsequent processing such as heat-treatment or frying of the potato product to which the flavor enhancer is added. The flavor imparted to the finished product also does not experience loss of flavor or develop off-flavors during subsequent storage life. In addition, the flavor enhancing composition is made from a combination of flavor constituents that are easily available and require no processing, except for one component which requires only minimal processing, as opposed to the complex synthesis or processing of many of the prior art flavor enhancing ingredients.

SUMMARY OF THE INVENTION

Briefly, the potato flavor enhancing composition includes a combination of non-volatile sugar, acidic and metallic flavor components, together with a dry potato-based ingredient heated at elevated temperatures to produce a bitter flavor component as well as a component having a characteristic potato flavor. This combination of flavor-enhancing components, when added to an intermediate potato-based food product and subjected to subsequent processing, produces a natural potato flavor in the finished product, without any one of the flavors being dominant.

The constituents are selected so that the flavor of the finished product is balanced, that is, the perceived levels of sugar, acidic, metallic and bitter taste stimuli are similar to those from the same potato product prepared from fresh potatoes. In the preferred embodiment, the sugar, acidic and metallic components are selected from the natural constituents of a raw potato, although in levels different from those found in the natural raw potato. A preferred sugar flavoring component can be the chief sugars of the potato, namely, sucrose, fructose or glucose. For the metallic flavor component, a potassium salt such as potassium chloride or potassium glutamate, or a phosphate salt such as disodium phosphate can be used. For the acidic flavor component, organic acids present in the potato, such as citric acid and malic acid, can be used. The bitter flavor component is, in one embodiment, provided by toasted or baked potato solids prepared by heating conventionally dehydrated potatoes to a temperature of at least about 250° F. to cause a rapid dehydration and browning of the pieces. The toasted or baked potato ingredient produces a bitter aftertaste characteristic of baked potatoes or freshly fried potato chips.

The flavor enhancing composition also can include an optional salt constituent, preferably sodium chloride. The salt component is optional depending upon the desired amount of salt in the finished product. Even though most potato products are salted externally, it is sometimes advantageous to include a small amount of internal salt in the finished product to achieve a desired flavor balance with the other added flavor enhancement ingredients.

The flavor enhancing composition can be used in various processes for making potato products. As examples, the flavor enhancer can be mixed with dehydrated potatoes to enhance the flavor of mashed potatoes; it can be added to a potato-based dough that is later formed by extrusion or the like and fried for making a fried potato snack; it can be added to various binders for potato shreds or pieces that are later fried into various composite potato products; or it can be used in the water used for reconstituting dehydrated potato pieces.

In one embodiment, the flavor enhancing composition includes a sugar component in a range of about 1% to 4%, an acidic component in the range of about 0.05% to 0.3%, a metallic component in the range of about 0.4% to 1.5%, and a bitter component in the range of about 0.1% to 5%, based on the total dry solids present in the composition to which the flavor enhancer is added.

In another embodiment, the sugar component of the flavor enhancing composition is adjusted, depending upon the sugar level in the base processed potato or the potato-based composition to which the flavor enhancer is added. For instance, the flavor enhancer can be added to improve the flavor of potato pieces already containing externally added sugar, normally reducing sugars, to increase coloration upon subsequent heat-treatment. In these instances, the sugar component can be omitted from the flavor enhancer, or it can be present at lower levels of up to about 4% of the total dry solids present in the composition to which the flavor enhancer is added. The sugar contained in the flavor enhancer is balanced not only against the amount of sugar contained in the potato product to which it is added; it is also balanced against the amount of the acidic component in the flavor enhancer to produce the desired sugar/acid balance in the final product.

These and other aspects of the invention will be more fully understood by referring to the following detailed description.

DETAILED DESCRIPTION

This invention can be applied to most forms of processed potatoes, but the invention is particularly suited for processes in which the flavor enhancing ingredients can be uniformly dispersed throughout the product. For example, the invention has particular application to processes in which snacks are made from a dough containing mixtures of dehydrated potato ingredients. In this instance, the flavor enhancing ingredients can be added to the potatoes used to prepare the dried mashed potatoes before dehydration, or preferably, to the formulation for the snack dough.

For processes in which cut potato pieces are dehydrated or fried, the precut blanched pieces can be dipped in a solution of the flavor enhancing ingredients. Examples are the manufacture of potato chips, frozen French fried potatoes, and the like. Because of the difficulty in applying consistent applications of the flavor enhancing ingredients to such cut pieces, however, the invention is normally practiced with products where the flavor components are uniformly dispersed throughout the product; and examples of these will now be described.

Dehydrated Mashed Potatoes

During the manufacture of potato flakes or potato granules, potatoes are subjected to a number of operations that reduce and alter the original natural potato flavor. For example, in both processes the potatoes are normally peeled, sliced and then precooked and cooled in water to improve the texture of the finished product. During these operations and also during cooking, a significant amount of soluble flavor components is lost. In addition, during the intensive mixing that takes place on the applicator rolls in the flake process, or in the mix-back operation in the granule process, the original flavor ingredients are modified by the physical and chemical action, producing flavors that are untypical for normal mashed potatoes. See, for example, Kintner, Judith A., "Flavor Characteristics of Conventional and Fabricated Potato Chips," Ph.D. Thesis, University of Nebraska, 1983. In addition, a considerable loss of volatile flavor constituents occurs during dehydration, as attested to by those experienced at working in potato dehydration processing plants. Following drying to a stable moisture content of about 7%, the products experience flavor degradation during storage by nonenzymatic browning and oxidative deterioration of the potato lipid constituents. See, for example, *Potato Processing*, AVI, Third Edition, Chapters 12 and 13 for a detailed discussion and references for these processes.

Addition of the flavor balancing ingredients of this invention to dehydrated potatoes restores the sugar/acid balance as well as the background bitter/metallic flavors which are important parts of the total flavor spectrum normally found in freshly cooked mashed potatoes. This combination of flavors is lost during processing of the dehydrated potatoes. When this combination of flavor enhancing ingredients is used, the full complement of potato flavor balance is achieved, which cannot be obtained by the use of flavor enhancing ingredients that add less than all of the sugar, acid, bitter and metallic flavor components provided by this invention. For example, during the final drying of potato flakes or potato granules, the product could be slightly scorched to achieve a greater bitter flavor component. However, it is known that formation of baked potato flavor only occurs when potato solids are heated to above 100° C., to form the pyrazines responsible for baked potato flavor. The final drying of potato flakes and granules is conducted at lower temperatures, for example, about 50° C. to 60° C. At these temperatures, there is little if any formation of pyrazines. In addition, such dried mashed potato products treated at the higher temperature would have an untypical brown discoloration if the entire quantity of this finished product were so treated.

Fabricated Potato Snacks

The manufacture of a of snack products is described in general in U.S. Pat. No. 3,997,684 to Willard. These snack products are largely characterized by a bland potato flavor profile and possibly off-flavors because of the large extent of processing to which the potato material is subjected. For the most part, these snack products are made from dehydrated potatoes which have already been subjected to losses of flavor attributable to leaching, plus changes in flavor due to intensive mixing and dehydration; and they are often subjected further to intensive moist heat treatment and, in most cases, to exposure to a second heat treatment by frying or high temperature extrusion.

In contrast, a potato chip made from a thin slice of raw potato experiences only a small amount of flavor loss by leaching during washing of the cut potato slices. During frying of the thin slices of potato, flavors develop through the interaction of the hot fat with the myriad of yet unchanged basic original potato ingredients, and the resulting flavor profile is considered the ultimate in fried potato flavor. When consuming an unsalted freshly fried potato chip, one can observe the complexity of the many flavors as the tastebuds react to the solubilized components responsible for its total flavor profile. In contrast, the flavor of fabricated potato snacks made without the flavor enhancement of the present invention exhibits only a passing resemblance to real potato chips. In fact, there are presently on the market several fabricated potato snacks made from dehydrated potatoes which are constantly criticized because of their bland flavor.

Hash Brown Potato Patties and Similar Fried Products

The frozen potato industry has developed a number of by-products from the cut pieces of raw potatoes that are too short or misshapen for use as French fries. Products made from these pieces, normally called slivers and nubbins, have a low flavor profile. The products are subjected to considerable water leaching during the cutting, grading, blanching and cooling operations. Also, these cut pieces are normally formed into larger shapes, such as patties or cylinders, and then fried. During frying only the outside surfaces of the shaped products are contacted by the hot fat. The formed products have less fried potato flavor because the fried outside areas have had much of the soluble flavor precursors extracted, and the internal portions comprise only the relatively flavorless particles that are bound together in a watery mass. In contrast, a French fried potato is subjected to hot fat along the entire surface of the potato, and the characteristic fried potato flavor develops uniformly around and diffuses throughout the piece. The inside of the French fry comprises blanched original potato tissue containing substantially all of the original potato flavor components. The inside particles in a "Tater Tot" or a "McDonald's Breakfast Patty," to name two products currently on the market, are blanched potato particles that have lost far more flavor components and have not developed additional flavor by intensive cooking or through frying. The flavor enhancement ingredients of this invention can be mixed with the chopped potato pieces before frying so that the resultant balanced potato flavor can complement the fried exterior of the piece. The same approach also can be applied to other potato products made from chopped or mashed pieces such as croquettes or dumplings.

Dried Potatoes

Hash brown potatoes are made from dried potato shreds which are rehydrated, and often mixed with a binder to form a patty which can be fried on a grill. The potato shreds are often produced commercially from fresh, blanched potatoes which are cut into long, thin strips and then dehydrated. These shreds have a bland flavor because many of the flavor constituents are extracted during washing and blanching, or they have a slight off-flavor normally associated with dried potatoes. The flavor enhancing composition of this invention can be added to the water used for reconstituting dehydrated potato shreds. The added flavor profile ingredients produce a fried hash brown potato patty with a flavor resembling a freshly prepared hash brown potato patty, substantially higher in flavor perception and quality than the storage off-flavors or bland flavor of hash browns made from conventional dehydrated potato shreds and binders. This flavor enhancing composition can also be added to extruded or otherwise formed, fabricated dried has brown strips, such as described in U.S. Pat. Nos. 3,634,105; 3,725,097; and 3,992,222.

Selection of Flavor Enhancement Components

Thus, when potatoes are processed, the desired fresh potato flavor disappears or is modified. As examples, flavor constituents are lost or modified by water treatment such as leaching, or by chemical changes that occur during processing steps such as blanching, extrusion or forming, high temperature treatment such as drying, or frying. The present invention is based on a recognition that certain potato flavor constituents can be combined in a unique and critical combination to produce a flavor enhancing composition that can be added to potatoes subjected to further processing, with the result that the end-product has a composite flavor profile that still resembles the flavor of fresh potatoes. It has been recognized that certain natural potato flavor-producing components that provide sugar, acidic, metallic and bitter constituents can, in combination, produce such a flavor enhancer. These components are certain of those natural potato flavor-producing constituents recognized to have been lost during processing and which, when combined in proper proportions, produce a composite flavor profile that resembles the flavor of fresh potatoes. Moreover, it has been recognized that these individual flavor components can be provided by natural flavor enhancing components that are each stable or non-volatile during subsequent processing, including high temperature treatment such as dehydration, or frying. The individual flavor components are comprised of certain select ingredients naturally present in a potato but which are combined in amounts and relative proportions that are, for the most part, different from those occurring naturally in a potato.

One embodiment of the flavor enhancing composition is formed by a mixture consisting essentially of a sugar component in the range of about 20% to 80%, an acidic component in the range of about 1% to 10%, a metallic component in the range of about 2% to 50%, and a bitter component in the range of about 1% to 80%, by weight based on the total dry solids present in the flavor enhancing composition. It is critical that each of these components be present in the flavor enhancer, each in an amount that is noticeable in its flavor in the finished product. (The relative proportions cited herein are with respect to the sugar, acidic, metallic and bitter flavor components only, and are independent of any other optional flavor enhancing components that may be used in the flavor enhancer.) As emphasized in more detail below, the sugar level in the flavor enhancer is balanced in relation to the sugar level present in the potato product to which the flavor enhancer is added. Dehydrated potato shreds are an example. The sugar component of the flavor enhancer can be present at lower levels if the sugar content of the base potato is high, or if a reducing sugar has been added to the shreds during processing to improve browning. In other words, the sugar originally present in the potato product furnishes a portion of the sugar in the total flavor profile. In one embodiment, the sugar component is present in the flavor enhancer from 0% up to about 20% of the total dry solids present in the flavor enhancing composition.

Good natural potato flavor in a finished product is obtained when the flavor enhancer is added to an intermediate potato-based product in the following proportions: a sugar component of about 1% to 4%, an acidic component of about 0.05% to 0.3%, a metallic component of about 0.4% to 1.5%, and a bitter component of about 0.1% to 5%, by weight based on the dry solids present in the intermediate composition. A portion of the 1% to 4% sugar component can be provided by sugar added externally to the potato material to which the flavor enhancer is later added for improving its flavor. A presently preferred formulation is 3% sugar, 0.19% acidic, 0.6% metallic and 0.5% bitter, where the bitter potato component is heated to from about 250° F. to about 285° F. or more to a moisture content of 3.5% to 4%. Each of the flavor components is essentially non-volatile and, upon subsequent heating or frying of the intermediate product, a finished product can be formed having a composite flavor profile resembling fresh potato flavor, without any one of the components being dominant.

A. Suqar

A sugar component is included in the flavor enhancing composition. During storage of raw potatoes, reducing sugar can accumulate over a wide range as a result of storage conditions, particularly temperature. As a result, the concentration of reducing sugars in all cooked or processed potatoes can vary over a wide range; this is reflected in the perceived sweetness of the finished product. Much of the sugars originally present in a potato are leached from the potatoes by water used in processing them. The sugar component of the flavor enhancing composition adds the sugar flavor back into the flavor profile. The amount of sugar in the flavor enhancer can be varied according to the sweetness desired and the sweetness of the product whose flavor is being enhanced. The level of sugar in the flavor enhancer varies in the range from 0% to about 80%, by weight of the total dry solids present in the flavor enhancer. An amount of sugar in the range of about 20% to 80%, by weight of the total dry solids present in the flavor enhancer, is preferred. This level is useful to replace the natural sweetness lost during processing. The amount of sugar in the flavor enhancer can be lower, however, if a certain level of sugar is naturally present or has been previously added to the potato solids during processing, and the flavor enhancer is then added later. The sugar added during processing may raise the sweetness level sufficiently that the sugar component in the flavor enhancer can be omitted or can be present at a low level in proportion to the other components of the flavor enhancer.

A reducing sugar can be added to a product not subjected to heat if more sweetness is desired; or in the common practice where additional browning is needed for color and flavor development during frying. Sugar, normally non-browning sucrose, (from the flavor enhancing composition) is preferably added to an intermediate product in an amount from about 1% to 4%, by weight based on the total dry solids present in the composition to which the flavor enhancer is added. The ranges of sugar added to various products can vary; and in one embodiment, the amount of sugar in flavor enhancers for several products are as follows: approximately 1% to 4% for dehydrated mashed potatoes, approximately 1% to 5% for fabricated potato snacks, and approximately 2% to 4% for hash brown patties and fried logs. Levels of sugar below about 1% to 2% cannot easily be discerned with acid present in the formulation. Levels at 5% or higher are unbalanced with the other components in the flavor enhancer present. A certain level of sugar in the finished formulation can be provided by sugar that normally occurs in the potato or has been previously added to the potato during processing. In these instances, the amount of sugar in the flavor enhancer is lowered and is balanced in relation to the sugar actually present in the potato to provide the proper amount of sugar in the finished formulation. The total sugar content should be within the 1% to 4% range.

As mentioned previously, the sugar component in the flavor enhancer can be optional in some instances if the potatoes to which the flavor enhancer is added already have a sufficiently high sugar level. For instance, conventional dehydrated potato shreds used in hash brown potatoes often are dipped in dextrose (glucose) to increase browning during subsequent frying. If this added sugar level is sufficiently high, no additional sugar need be present in the flavor enhancer when used to improve the flavor of the potato shreds.

The preferred sugar included in the flavor enhancer is sucrose, although other sugars such as fructose and glucose, or mixtures thereof can be used. These sugars are preferred because they occur naturally in a potato and they are non-volatile and water soluble. In addition, any food grade sweetener also can be used to achieve the equivalent level of sweetness by those experienced in the art.

B. Acid

Potatoes contain a large number of acids, including amino acids, fatty acids, and organic acids. Examples of organic acids naturally occurring in a potato are citric, malic, tartaric, oxalic and lactic acids. See, for example, Smith, *Potatoes: Production, Storing, Processing*, AVI, p. 81. While other acids or salts could be considered, I have found that citric acid and malic acid produce a natural tasting acidic constituent in the flavor enhancer. A presently preferred ratio is about 2.5 to 4 parts citric acid to 1.0 part malic acid. The flavor enhancer preferably includes about 1% to 10% acid, on a moisture free basis.

As in most food products, particularly fruit products, the level of the acidic component must be balanced with the level of the sugar component which can include the natural sugars remaining the processed potato products. An excess of acid is quickly noted by most flavor experts, so adjustment of the acidic flavor component with respect to the sugar component is critical, but is subject to considerable variation according to the nature of the product and the quantity of natural sugar remaining in the product. Fried potato products, for example, may require a higher acid level due to the presence of the strong fried potato flavor than a rehydrated mashed potato product which has a more bland flavor. The level of the acidic component used in the flavor enhancer is preferably in the range of about 0.05% to 0.30%, by weight of the composition to which the flavor enhancer is added, on a moisture free basis. Citric acid is preferred because it remains stable and does not break down under heat from subsequent processing, as does ascorbic acid, for example. Although malic acid has an unusual flavor, its presence even in a small level has been found to provide a good natural overall flavor profile in the flavor enhancer. Malic acid also remains stable and does not break down under heat. Both citric and malic acid are added in dry solid particulate form and are both water soluble.

An acid component in the range of about 1% to 10% of the total dry solids in the flavor enhancing composition, together with a sugar component in the range of about 20% to 80% provides the limits between which the sugar/acid balance can be adjusted to achieve the desired flavor enhancement.

C. Metallic

The flavor enhancing composition also includes metallic and bitter flavor constituents. Although it is often difficult to distinguish levels of each of these flavor responses separately, the metallic flavor constituent will be described here and the bitter flavor constituent will be separately described below. The metallic flavor component comprises one or more salts of a metal naturally present in a potato. Preferably, the metallic flavor component comprises a potassium salt, although a phosphorus salt also can be used at least in part to produce the metallic flavor component. It is recognized that potatoes are a major source of potassium in the diet, and I have found that use of a potassium salt in processed potato products produces a good natural tasting metallic and somewhat bitter flavor in the finished product. The preferred level of the metallic component is present in the range of about 2% to 50% by weight of the total dry solids present in the flavor enhancer. When the flavor enhancer is added to an intermediate product, the metallic component is present in the range of about 0.4% to 1.5%, by weight based on the total dry solids present in the composition to which the flavor enhancer is added. A more preferred use level of potassium salt for potato products is about 0.5% to about 0.75% by weight on a moisture free basis. The mineral content of potatoes varies depending upon where they are grown, and potassium naturally occurring in potatoes varies from about 1.8% to about 2.5% on a dry solids basis. The preferred potassium salt included in the metallic constituent of the flavor enhancing composition is potassium chloride which is believed to be different from the source of potassium naturally found in a potato. As an alternative, the metallic flavor component can be provided by a health food product marketed under the name "K" salt and comprises a mixture of potassium chloride, glutamic acid, potassium glutamate, and tricalcium phosphate, the overall concentration of potassium in the salt being about 45%. As an alternative source of the metallic flavor component, a phosphorus salt such as sodium phosphate also can be used. Raw potatoes normally contain from 120 to 300 mg of phosphate, expressed as mg per 100 gm of dry solids. Sodium acid pyrophosphate is commonly added to potato products at levels sufficient to whiten the finished product by reacting with iron present in high levels in potatoes. I have found that for some uses either this ingredient or disodium phosphate can be optionally used with the other flavor constituents to produce a somewhat metallic or background earthy flavor.

Potassium chloride and sodium phosphate provide good flavor in the finished product, and both salts are soluble in water, as well as being non-volatile in the sense that they do not break down or become altered in flavor upon subsequent processing, including high temperature heat treatment.

D. Bitter

Potatoes exhibit a definite flavor constituent, and this flavor constituent is included in the flavor enhancing composition by potato solids which have been heated at elevated temperatures and dried to impart a somewhat scorched or baked potato flavor to provide the bitter flavor component. The baked potato solids provide a characteristic potato flavor, akin to a baked potato flavor, in the flavor enhancer in addition to the bitter flavor component. Potato solids are subjected to a high level of heat treatment, specifically by heating them to a temperature of preferably about 275° to 300° F., or higher. They are heated sufficiently to reduce the moisture content to below about 5% by weight. This produces a potato ingredient with a distinctly bitter but characteristic potato flavor which can be used in a number of processed potato products in conjunction with the sugar, acid and metallic components in the flavor enhancer. The resulting flavor enhancing composition produces potato products with flavors closely resembling the same products made from fresh potatoes. The bitter component is preferably used in a range of about 1% to 80%, by weight based on the total dry solids in the flavor enhancer. The amount of the bitter component within this range can be varied depending upon the intensity of the bitter flavor provided by the bitter component.

In one method for making the bitter flavor component, previously dried potato pieces such as potato slices or potato dice are heated at an air temperature of 350° F. so that the pieces are heated to at least about 275° F. to achieve a rather dark brown coloration. The level of bitter flavor in the bitter flavor component is intensified as heating and resulting drying or toasting of the potato solids increases. It is desirable to heat at sufficiently high temperature levels and to sufficiently low moisture contents to achieve the browning that produces the desired strong bitter flavor. Heating previously dried potato pieces to at least 250° F. and to a moisture content below about 5% provides a good bitter flavor component. Heating more rapidly at higher temperatures produces a stronger, more intense bitter flavor component. The bitter component can be made from different processes to achieve different levels of intensity of the bitter flavor component. For example, an intense bitter flavor is produced by high heat treatment of the potato solids to a temperature of at least about 275° to 285° F., a final moisture content of less than about 3.5% to 4%, and an Agtron color index from about 25 to 40. Use of such an intense bitter flavor component in the flavor enhancer requires less of the bitter component than when a more standard lower heat treatment method is used for making the bitter component. A more standard bitter component is produced by lower level heat treatment of potato solids to a temperature of at least about 250° F., a moisture content below about 5%, and an Agtron color index between about 60 and 63. When using the high intensity bitter component, a preferred ratio of components in the flavor enhancer is about 20% to 80% sugar, about 1% to 10% acidic, about 5% to 50% metallic, and about 1% to 40% bitter, by weight based on the total dry solids in the flavor enhancer. When using the lower intensity bitter component, a preferred ratio of components in the flavor enhancer is about 20% to 60% sugar, about 1% to 10% acidic, about 2% to 20% metallic, and about 20% to 80% bitter, by weight based on the total dry solids present in the flavor enhancer.

One method for determining whether the bitter component is produced at a sufficient level of heat treatment is through color specifications. All color measurements referred to herein are made with the Agtron Model E-5F manufactured by Magnusen Engineering, widely used to establish color standards in the food industry. Table 1 below illustrates the effect of temperature in various toasted products, where the color index has a lower number as the color becomes darker. It also illustrates that color becomes lighter as the particle size of the toasted ingredient is reduced.

TABLE I

| Product | Color Index |
| --- | --- |
| Potato Flakes | |
| Unheated | 80 |
| Heated to 250° F. | 47 |
| Heated to 275° F. | 41 |
| Sliced Dehydrated Potatoes | |
| Unheated | 78 |
| Heated to 275° F. (unground) | 45 |
| Ground to pass 20 mesh (420 microns) | 51 |
| Ground to pass 40 mesh (840 microns) | 68 |

It has been found that finely divided potato solids heated to an Agtron color index range of about 25 to about 60 exhibit a sufficiently dark color and thus a sufficiently high flavor intensity that a good bitter potato flavor component is produced. The resulting bitter flavor component preferably is used at a level of about 0.1% to 5%, by weight based on the total dry solids present in the composition to which the flavor enhancer is added. More intense bitter components can be added at a level of about 0.1% to 0.5% by weight, whereas a more standard bitter flavor component can be added at a level of about 0.5% to 5% by weight.

It has been discovered that the bitter flavor component produced by the heat-treated potato solids must be used in conjunction with the non-volatile sugar, acid, and metallic components described above to achieve the balanced flavor profile desired in the various processed potato products to which the flavor enhancer is added. If the baked potato ingredient is used alone in such products, only the bitter flavor is produced which is objectionable to most flavor test experts. The bitter flavor component is reasonably non-volatile in the sense that its bitter flavor is not evaporated or altered upon subsequent processing of the potato product to which the flavor enhancer is added. Heat-treated potato solids do exhibit a slow loss of flavor characteristic of baked potato flavor during prolonged storage of the dry ingredients. Such loss of flavor can be minimized by using the baked potato flavor component immediately after it is prepared. Disappearance of flavor from the flavor enhancer during storage has not been noticed once the flavor enhancer is used in a finished product.

In a first embodiment of the process for making the bitter flavor component, previously dried potato pieces, which can be in the form of dehydrated diced or sliced potatoes, are heated, preferably in a stream of air held at about 275° to 325° F. for a period of about 3 minutes. During this time, the moisture content of the potato pieces is reduced from about 7% to about 3% to 4½%, and the darker color develops rapidly. Alternatively, the dried potato pieces can be heated in an oven or in a rotary dryer in which the heat transfer is slower, but the end product is reasonably similar in its bitter flavor. In any case, the dried and browned pieces are then ground to the optimum particle size for the intended use, normally such that the particles all pass through a 20 to 40 mesh screen.

In a second embodiment of the process for making the bitter flavor component, dehydrated potatoes may be reduced to particulate form before heat treatment. For example, dehydrated diced or sliced potatoes can be ground to a final desired particle size, say through a 20 to 40 mesh U.S. standard sieve. Alternately, finely divided dehydrated potatoes such as potato flakes, potato granules, or potato flour may be heat-treated to form the bitter component of the flavor enhancer. The flavor of the heat-treated potato solids produced from various dehydrated products is different depending upon the process used and the particle size. For example, dehydrated mashed potatoes such as potato granules exhibit a different bitter flavor profile than a heat-treated ground diced dehydrated potato. In the former, potatoes are cooked and mashed during processing to form the finished potato granules, and this alters the balance and distribution of the original flavoring ingredients. In the dehydrated diced potato, the original intact potato cells contain the same flavor precursors present in the original potato flavor (less those lost by extraction during processing or modified by the dehydration process). The flavor intensity of the finished baked potato flour also is affected by the reducing sugar and amino acid composition of the parent starting material and by the presence or absence of food additives in the dehydrated products, particularly sodium bisulfite which is normally added to prevent non-enzymatic browning. The selection of the appropriate dehydrated ingredient can only be made through experimentation with the finished product in question and established by accepted flavor test procedures known in the food industry. For heat treatment of particulate forms of dried potatoes, it is convenient to use a mixer or screw conveyor fitted with external and optionally internal jackets through which a heat exchange medium such as heated oil or high pressure steam can be used to transfer heat into the agitated bed of particulate solids. Other means known to the art for toasting dry ingredients such as fluid bed dryers, vibratory tray dryers, etc., also can be used with equal success.

E. Other ingredients

Many other mineral compounds found in potatoes are in such low levels that they have little impact on the overall flavor profile. In addition, use of many such compounds as food ingredients has not been established.

Vanillin is one of the most widely used blending flavors. I have noted that the flavor of an unsalted freshly fried potato chip has a distinct vanillin constituent, particularly if the potato chips have been made from unpeeled or very lightly peeled raw tubers. Vanillin is listed as an ingredient in the outer sections of potatoes (*Merck Indes*, 9th Edition, p. 9596). Experiments have confirmed that an extremely low level of vanillin, in the order of 500 ppm, based on the dry weight of solids present, creates the same missing constituent in fabricated potato chips. Use of this ingredient is optional, however, since the flavor does not blend well with all processed potato products.

I have also discovered that even though most potato products are salted externally, it is sometimes advantageous to include a small amount of internal salt in the finished flavor enhancing composition to achieve the desired flavor balance with the other added enhancement components. A major advantage of the use of the ingredients of this invention is the opportunity to reduce the overall sodium content of the finished product. Products containing the balanced flavor ingredients of this invention can normally be prepared with less sodium, expressed as sodium chloride, than if the ingredients were not added. In addition, the need for flavor enhancement by sodium-containing additives such as monosodium glutamate or disodium inosinate and guanylate is reduced or eliminated. The use of the ingredients is particularly recommended for potato products in which a low level of salt is desired for dietary sodium control. The range of salt, expressed as sodium chloride, used in various products in which the flavor enhancing composition may be used are as follows: 0% for dehydrated mashed potatoes, 0.2 to 1.0% for fabricated potato snacks, and 1.0% to 2.5% for hash brown potato patties and fried logs, by weight based on the total dry solids present in the composition to which the flavor enhancer is added.

Examples

The following examples describe several of the presently preferred methods for preparing the flavor enhancing composition of this invention. The combination of sugar, acid, metallic, and bitter components is referred to as Potato Flavor Profile Ingredients (PFPI).

EXAMPLE 1

This example describes preparation of three presently preferred products made by similar techniques but from different types of starting materials for providing the bitter (baked potato flour) component described above. Sample 1A was made from unpeeled dehydrated potato strips heated in a hot air dryer to approximately 275° and then ground to a fine powder. Samples 1B and 1C were made the same way, but from commercial dehydrated potato slices.

|  | 1A | 1B | 1C |
|---|---|---|---|
| Hot Air Temp. (°F.) | 325 | 350 | 325 |
| Heating time (min.) | 3 | $\frac{3}{4}$ | $1\frac{3}{4}$ |
| Agtron color before heating | 50 | 59 | 78 |
| Agtron color after heating | 23 | 21 | 44 |
| Particle size |  |  |  |
| % on U.S. 40 mesh | 0 | 7 | 74 |
| % through U.S. 40 mesh | 100 | 93 | 26 |
| Agtron color after grinding | 45 | 44 | 49 |

Baked potato flour made according to these procedures can be used at a relatively high level in a potato product, say in the range of about 2.5% to 5% of the total solids in the composition, when the finished baked potato flour ground through the 40 mesh screen has a color in the range of bout 45 to 50 units. When making a more intense baked potato flour flavoring component for use as a bitter component in combination with the other flavor components of this invention, the pieces can be heated at higher temperatures and/or for a longer period of time so that the finished Agtron reading would be about 18 units, which is substantially darker. The baked potato flour thus produced would have a color of about 35 or so units, and because of its predominantly bitter potato flavor, it can be used at much lower levels, say about 0.1% to 0.5%, based on the total dry solids in the composition to which the flavor enhancer is added.

EXAMPLE 2

Potato flakes were made from Idaho Russet potatoes by standard means using a Buflovac 6-inch by 8-inch double drum dryer. The following standard ingredients were added to the control sample 2A and test sample 2B, expressed as a percent of total dry solids in the composition to which the flavor enhancer was added: 0.6% Myverol, 18-07 (mono- and diglycerides), 0.1% citric acid, 0.03% anti-oxidant, 0.1% sodium acid pyrophosphate, and 0.1% sodium bisulphite. In addition, the following amounts of special flavoring ingredients were added to the test sample 2B: 2.3% sucrose, 0.14% additional citric acid, 0.05% malic acid, 1.4% potassium chloride, and 2.5% baked potato flour (low heat treatment).

The dry solids were reconstituted with water and milk at 175° F. An experienced flavor test panel found that the flavor of Sample 2B had a richer fuller potato flavor than the control Sample 2A.

EXAMPLE 3

Extruded potato snacks were made according to the process described in my U.S. Pat. No. 3,997,684. The formula included potato granules, 17%; potato flakes, 25%; potato starch, 41%; corn flour, 12%; salt, 1.3% emulsifier, 0.3%. For each 1,000 gm of blended dry ingredients, 780 gm of water were added to form a moist dough for extrusion. Samples were prepared as follows:

Sample A: Control, using commercially available ingredient potato flakes.
Sample B: To the above dry ingredients were added the following PFPI components: sucrose, 3.00%; malic acid, 0.04%; citric acid, 0.15%; potassium, 0.60%; and a baked potato flour at 0.15%.
Sample C: The test flakes of Sample 2B, containing the flavor profile ingredients, were used as the potato flake component of the extruded potato snack. The calculated level of PFPI ingredients in this formulation was: sugar, 0.61%; malic acid, 0.015%; citric acid, 0.04%; potassium chloride, 0.36%; baked potato flour, 0.67%.

The samples were evaluated by a group of random tasters, as well as the expert panel. It was concluded that sample 3 B was significantly preferred to the control sample, whereas sample 3C, with the lower level of PFPI ingredients was preferred slightly compared to the control sample. It was concluded that when adding the flavor enhancement ingredients to potato snack products made from dehydrated potatoes, the best approach is to add the flavor enhancement ingredients in controlled quantities to the snack mixture itself, rather than incorporating the ingredients into one of the potato components.

EXAMPLE 4

A number of extruded potato snacks were made by either vertical batch piston extrusion or by continuous horizontal screw extrusion from mixtures of the following basic ingredients:

| Ingredient | Range, % by weight of total as-is dry ingredients |
|---|---|
| Potato granules | 10–30 |
| Potato flakes | 10–30 |
| Potato starch | 30–40 |
| Corn flour | 10–12 |
| Emulsifier | 0.3–.05 |

The emulsifiers were selected from the group of distilled monoglycerides such as Myverol 18-07 and lecithin. The ingredients were blended and mixed with the potato flavor enhancement products of this invention, singly or in various combinations. Water was added at a level of from about 70% to about 90% based on the total weight of dry as-is ingredients. The formed pieces of dough were fried from 1 to 3 minutes at a temperature of 350° F. to a final moisture content of about 2.0%.

Internal Salt. Most samples contained 0.5% to 0.6% sodium chloride, the total range being 0% to 1.5%. The level of flavoring ingredients are expressed throughout this example as a percentage of total dry ingredients on the as-is basis (as opposed to a moisture-free basis). The total salt content of the finished snack was maintained at 1.75%, the balance being applied externally.

Sugars and Organic Acids. Preliminary screening trials were made with sucrose, citric acid and malic acid. Sucrose levels below 2% were not easily identifiable in the presence of the acids; levels as high as 5% were tested but the flavors from all components in the flavor enhancer, in combination were unbalanced. Tests conducted without sucrose in the formulation to establish correct acid levels were inconclusive. Initial combination of 2% sucrose, 0.2% citric and 0.016% malic acid were found too acidic. Further testing showed that a level of 3% sucrose, 0.15% citric acid and 0.04% malic acid was ideal. It was found desirable to dissolve the acids in the water of hydration of the formula to achieve uniform distribution and avoid contact of the tongue with an undissolved acid crystal. Replacement of malic acid with ascorbic acid did not produce as good a potato flavor note.

Potassium Salt. Initial tests were made with a proprietary product known as "K-Salt" made by Chicago Dietetic Supply, Inc., La Grange, Illinois, containing potassium chloride, glutamic acid, potassium glutamate and tricalcium phosphate. Added as a single ingredient in the range from 0.25% to 0.50% confirmed the presence of the earthy metallic note traditionally found in freshly processed potato chips. Potassium chloride alone was found to give a cleaner, more characteristic, potato flavor at levels of 0.60% to 0.65%.

Baked Potato Flour. Samples were produced by the following methods:

A. Dehydrated potatoes crushed to pass a 20 mesh screen were toasted on a tray in an oven maintained 400° F. for a period of about 10–20 minutes.

B. Sliced or diced dehydrated potatoes were exposed to hot air in a through circulation conveyor dryer at temperatures ranging from 275° F. to 350° F. for periods of 1 minute to 4 minutes. The product was ground to pass either a 20 mesh (840 micron) opening or 40 mesh (420 micron) opening.

C. Crushed dehydrated potatoes, potato flakes, or potato granules were slowly stirred in a stainless steel bowl held in a deep-fat fryer maintained at 400° F. Products were made within the range of Agtron measurements of 20 to 50 for testing in the snack products described above. In one experiment, crushed dehydrated potatoes were analyzed continuously during the heating cycle. The screen analysis of the potatoes was as follows:

| | |
|---|---|
| On 20 mesh | 5.2% |
| On 40 mesh | 70.1% |
| On 60 mesh | 13.9% |
| On 80 mesh | 4.7% |
| Thru 80 mesh | 5.6% |

The original color was 78 Agtron units and; the original moisture content was 7.8%. The 1000 gm sample was stirred continuously in a 5-quart stainless steel bowl set in a batch deep-fat fryer in which the oil was maintained at 400° F. The observed results were as follows:

| Time (min) | Temp. (degrees F.) | Color (Agtron) | Moisture % |
|---|---|---|---|
| 9 | 256 | 61 | 4.9 |
| 10 | 268 | 55 | 4.7 |
| 12 | 275 | 48 | 4.0 |
| 12.2 | 280 | 44 | 3.3 |
| 13.75 | 285 | 40 | 3.5 |
| 16.75 | 290 | 36 | 2.7 |

D. A 10 cubic foot jacketed paddle mixer made by Rapids Machinery, Model FPS-2436, was heated by circulation of fat held at 400° F. Crushed dehydrated potatoes substantially all passing 20 mesh were heated with the mixer turning at 20 rpm to achieve uniform heat distribution. The product was heated to an internal temperature of 275° F., cooled and used for production of large quantities of extruded potato snack products. It was found that the optimum color for this ingredient was an Agtron color of 42 to 50 units. The baked potato flour was incorporated at levels from about 1% to 5% in snack products, along with the non-volatile sugar, acid and metallic components, with a positive improvement in flavor. Potato flakes passing through a 40 mesh screen and heated to an Agtron index of 26 to 35 were used at levels of only 0.1% to 0.05% since they contain a higher level of bitter scorched potato flavor.

A crunchy, less brittle texture was obtained by adding the crushed dehydrated sliced or diced potatoes to the finished snack product without grinding finer than 20 mesh. It was found particularly advantageous to soak the toasted particles in roughly four times their weight in water for a period of 3 to 5 minutes before adding to the snack formula. The flavor and texture of the finished product made this way was judged superior to the same product ground more finely and distributed into the product along with the other dry ingredients.

Following preliminary screening of the above-mentioned flavor enhancement components, finished snack products were made in which all were added at the optimum levels. Judgments by expert flavor tasters and more extensive consumer tests confirmed that the flavor of the finished fried products compared favorably, and in some cases were judged superior, to the flavor of conventionally produced fresh potato chips.

EXAMPLE 5

Shredded hash brown potato patties were made from Idaho Russet potatoes with and without the PFPI according to the following formula:

| | Sample A | | Sample B | |
|---|---|---|---|---|
| | Moisture Free Basis % | As-Is Basis % | Moisture Free Basis % | As-Is Basis % |
| Shredded Potatoes | 95.2 | 99.0 | 92.3 | 98.33 |
| Salt | 2.4 | 0.5 | 2.3 | 0.70 |
| Dextrose | 2.4 | 0.5 | 2.3 | 0.50 |
| Sugar (Sucrose) | 0 | 0 | 0.9 | 0.36 |
| Citric Acid | 0 | 0 | 0.14 | 0.02 |
| Malic Acid | 0 | 0 | 0.06 | 0.01 |
| K Salt | 0 | 0 | 0.70 | 0.21 |
| BFP (high) | 0 | 0 | 1.30 | 0.39 |

These products were fried in liquid soybean oil, frozen and later reheated and tested for flavor. It was noted that a higher level of the PFPI was required for this product, probably because of the additional water present in the potatoes. Expert flavor tests indicated a definite preference for Sample B.

Various processed potato products have been made with the flavor enhancer and these products have received higher test ratings by 100% of those expert flavor testers who have sampled these products and compared them with the same products not having the flavor enhancer.

Separately, it has been confirmed by flavor tests involving over 2,000 people that different processed potato products made with the flavor enhancer are superior in flavor to the same products made without it.

EXAMPLE 6

Examples 6 through 8 are related to use of the flavor enhancer in the water of hydration for dehydrated potato pieces such as dehydrated potato shreds, dried potato binders, and the like.

In a Sample A, dried hash brown potato shreds were produced from fresh, blanched potatoes. The dried shreds were rehydrated by adding hot tap water and allowing the potato shreds to stand for one hour.

In a Sample B, the same dried hash brown potato shreds as Sample A were rehydrated by adding hot water, and the flavor enhancing composition was dispersed in the water used to reconstitute the potato shreds. The composition of the flavor enhancer was: citric acid 4.07%, malic acid 1.02%, potassium chloride 20.3%, and toasted potato flakes 74.6%. 1.5 grams of the flavor enhancer were added to 210 ml water which was heated and added to reconstitute 50 grams of the dried hash brown potato shreds. Substantially all of the water was taken up by the potatoes. The reconstituted potatoes contained 0.13% citric acid, 0.033% malic acid, 0.655% potassium chloride, and 2.41% toasted potato flakes, on a moisture-free basis.

Samples A and B were fried on a standard household Teflon grill with a small quantity of vegetable oil. Flavor test results were conducted on Samples A and B. The results showed that the flavor of Sample A was barely recognizable as a natural potato flavor. It had a slight off-flavor normally associated with dried potatoes. The flavor of Sample B was that of a freshly prepared hash brown potato patty, substantially higher in flavor perception than Sample A and of excellent quality.

EXAMPLE 7

In a Sample C, fabricated potato shreds were made from a mixture of cooked potatoes, salt, seasonings and a binding agent to prevent separation of the mashed potatoes when the product is later rehydrated. The mixture was formed into thin shreds approximately 3 mm wide and 1.5 mm thick and about 40 mm long. The shreds were dried to about 7% moisture, at which point they looked like a dried pasta product with a rectangular cross section.

In a Sample D, a second quantity of the fabricated potato shreds was made by a process similar to Sample C. In Sample D the flavor enhancement composition was used along with the seasonings of Sample C. The flavor enhancement composition was the same as that used in Sample B of Example 6. The flavor enhancement ingredients were added at a level of 2.89% of the total dry solids of the mixture. The potato solids were formed into strips as described in Sample C and then dried. The composition of the final dried fabricated potato shreds, on a moisture-free basis, included citric acid 0.12%, malic acid 0.03%, potassium chloride 0.59%, and toasted ground potato flakes 2.15%.

The shreds in Samples C and D were reconstituted in hot tap water at 150° F. for a period of sixty minutes. Sample C had a flavor characteristic of the seasonings in addition to a bland but recognizable base potato flavor. Sample D which contained the flavor profile ingredients was recognizably more highly flavored with a characteristic fresh fried potato flavor, much superior to Sample C in its natural potato flavor.

EXAMPLE 8

A first dry mixture was made of 60% of the dried potato shreds used in Example 6 and 40% of the fabricated potato shreds from Sample C of Example 7. A second dry mixture was made with the same dried potato shreds from Example 6 and from the fabricated potato shreds from Sample D of Example 7. These blended samples were reconstituted with hot tap water, as described above, and fried on a household grill. The flavor of the blended sample containing the internally added flavor profile ingredients, the second mixture, was preferred unanimously to the first sample in which the flavor profile ingredients were not used. No additional flavor profile ingredients were added in the water of reconstitution for this example.

It has been demonstrated that the flavor profile ingredients of this invention can be used to enhance the flavor of dehydrated potato pieces by several methods. One method includes incorporating the flavor profile ingredients into the water used for reconstituting dehydrated potato pieces. For large scale commercial reconstitution of dry potato pieces, the flavor enhancement ingredients can be added to the water of hydration as a powdered, pre-weighed pre-mix. For small retail quantities of dehydrated potatoes, the flavor enhancement ingredients can be added to a package with instructions to thoroughly mix the dried potatoes with the water of hydration. Alternatively, an agglomerated combination of the flavor profile ingredients can be made to adhere to the surfaces of the dried potatoes by incorporating a suitable binder.

In a second method, the flavor profile ingredients can be added to cooked mashed potatoes at a relatively high level. The mashed potatoes can be dried by conventional means, and then pulverized and added to the dried potato pieces at a desired level. The combination of dried potato solids and the flavor profile ingredients can be either dry blended with the pieces or applied to the pieces as a water slurry before or during drying so that the materials adhere to the individual pieces. The term dried pieces as used herein means any potato product which is cut, blanched and dried to about 7% moisture, including elongated shreds, slices, dice, cubes, and the like.

In the flavor profile tests of Examples 6 through 8, sugar such as sucrose was omitted from the flavor profile ingredients. The sugar component was not included because of the high level of reducing sugar contained in the conventional potato shreds and in the fabricated shreds used in those examples. The conventional potato shreds had been dipped in dextrose during production to improve coloration upon subsequent frying. Dextrose also was added to the fabricated potato shreds for the same reason. The level of sweetness added to the shreds by the dextrose in both cases was sufficiently high that the sugar component was omitted from the added flavor profile ingredients, although sucrose or any sugar or sweetening agent could have been added to the flavor profile ingredients up to a level of about 1% of the total dry solids in the resulting composition and still produced good results. A greater level of sugar would have been too sweet. The choice of the appropriate sugar level to be used is easily made by those experienced in the art.

For those instances in which the potato-based material requiring flavor enhancement has a sufficiently high initial sweetness level, so that the sugar component can be omitted from the PFPI, the components in the flavor enhancing composition preferably are within the following ranges:
bitter: 50% to 80%
metallic: 50% to 50%
acidic: 1% to 10%
based on the total dry solids present in the flavor enhancing composition.

A small amount of sugar up to about 20% of the total dry solids also can be present in the flavor enhancing composition when added to potato-based compositions having an intermediate level of initial sweetness. In these instances, the components in the flavor-enhancing composition can be present in ranges similar to those in which no sugar is included in the flavor profile ingredients.

Accordingly, the amount of sugar used in the flavor profile ingredients can vary depending upon the amount of sugar contained in the potatoes to which the flavor profile ingredients are added. Potatoes with higher natural sugars can be flavored with a lower level of sugar in the flavor profile ingredients; if the potato products are to be fried during use, which typically masks the sugar component, then the amount of sugar in the flavor profile ingredients can be increased within its desired range; however, when the flavor profile ingredients are used in the water of rehydration for dehydrated potato pieces, the sugar content of the flavor profile ingredients can be at a lower level, and in some instances it can be eliminated when sufficient sugar is contained in the dried potatoes which serve as the starting material.

What is claimed is:
1. A potato flavor enhancing composition comprising a sugar component, an acidic component provided by at least one acid naturally present in a potato, a metallic flavor component provided by at least one salt of a metal naturally present in a potato, and a bitter flavor component provided by potato solids in dry particulate form which have been heated in air at a sufficiently high temperature for a sufficient length of time to cause browning of the potato solids to the extent that a bitter flavor component is produced by the heated dry particulate potato solids; and in which the sugar, acidic, metallic, and bitter flavor components are combined in relative proportions in the flavor enhancing composition such that the resulting composition provides a composite flavor profile that resembles a fresh potato flavor without the flavor of any one of said flavor components being dominant, and with the flavor of each component being noticeable when the resulting flavor enhancing composition is used as a flavoring agent in a potato-based composition.

2. The composition according to claim 1 in which the bitter component is produced by heating the potato solids to a temperature in excess of about 275° F., and to a moisture content of about 4% or less.

3. The composition according to claim 2 in which the flavor enhancing composition consists essentially of a mixture of said components present in the ranges of about 20% to 80% sugar, about 1% to 10% acidic, about 5% to 50% metallic, and about 1% to 40% bitter, by weight of the total dry solids present in the flavor enhancing composition.

4. The composition according to claim 1 in which the bitter component is produced by heating the potato solids to a temperature in excess of about 250° F. and to a moisture content of about 5% or less.

5. The composition according to claim 4 in which the flavor enhancing composition consists essentially of a mixture of said components present in the range of about 20% to 60% suqar, about 1% to 10% acidic, about 2% to 20% metallic, and about 20% to 80% bitter, by weight of the total solids present in the flavor enhancing composition.

6. The composition according to claim 1 in which the acidic component includes citric acid and malic acid.

7. The composition according to claim 1 in which the metallic component is provided by a potassium salt, a phosphorus salt, or mixtures thereof.

8. The composition according to claim 1 in which the sugar, acidic and metallic flavor components are essentially non-volatile.

9. The composition according to claim 1 in which a proportionately lower amount of the bitter flavor component is included in the resulting composition as the amount of heating of the dry particulate potato solids increases.

10. The composition according to claim 1 in which the potato solids for the bitter flavor component are selected from the group consisting of dehydrated potato flakes, granules, dice and slices.

11. The composition according to claim 1 including a salt component provided by sodium chloride.

12. The composition according to claim 1 including vanillin.

13. A potato flavor enhancing composition comprising a sugar component which includes sucrose, an acidic component provided by one or more acids naturally present in a potato and including at least an acid selected from the group consisting of citric acid and malic acid, a metallic flavor component provided by at least one salt of a metal naturally present in a potato and including at least a metal salt selected from the group consisting of a potassium salt and a phosphorous salt, and a bitter flavor component provided by potato solids in dry particulate form which have been heated in air at a sufficiently high temperature and for a sufficient length of time to cause browning of the potato solids to the extent that a bitter flavor component is produced by the heated dry particulate potato solids; and in which the sugar, acidic, metallic, and bitter flavor components are non-volatile and are combined in relative proportions such that the resulting composition provides a composite flavor profile which resembles a fresh potato flavor without the flavor of any one of said flavor components in the composition being dominant, and with the flavor of each component being noticeable when the resulting flavor enhancing composition is used as a flavoring agent in a potato-based composition.

14. The composition according to claim 13 in which the bitter component is produced by heating potato solids to a temperature in excess of about 275° F. and to a moisture content of about 4% of less.

15. The composition according to claim 14 in which the flavor enhancing composition consists essentially of a mixture of said components present in the ranges of about 20% to 80% sugar, about 2% to 10% acidic, about 5% to 50% metallic and about 1% to 40% bitter, by weight of the total dry solids present in the flavor enhancing composition.

16. The composition according to claim 13 in which the bitter component is produced by heating the potato solids to a temperature in excess of about 250° F. and to a moisture content of about 5% or less.

17. The composition according to claim 16 in which the flavor enhancing composition consists essentially of said components present in the range of about 20% to 60% sugar, about 1% to 10% acidic, about 2% to 20% metallic, and bout 20% to 80% bitter, by weight of the total dry solids present in the flavor enhancing composition.

18. The composition according to claim 13 in which a proportionately lower amount of the bitter flavor component is included in the resulting composition as the amount of heating of the dry particulate potato solids increases.

19. The composition according to claim 13 in which the acidic component includes citric acid and malic acid and in which the citric acid is present in the range from about 2.5 parts to about 4 parts for one part of the malic acid.

20. The composition according to claim 13 in which the potato solids for the bitter flavor component are selected from the group consisting of dehydrated potato flakes, granules, dice and slices.

21. The composition according to claim 13 including a salt component provided by sodium chloride.

22. The composition according to claim 13 including vanillin.

23. A potato flavor enhancing composition comprising a sugar component which includes sucrose; an acidic component selected from the group consisting of citric acid and malic acid; a metallic flavor component selected from the group consisting of a potassium salt and a phosphorous salt; and a bitter flavor component provided by dry particulate potato solids which have been heated in air to a temperature in excess of about 250° F. and to a moisture content of about 5% or less to cause browning of the potato solids to the extent that a bitter flavor component is produced by the heated dry particulate potato solids; and in which the sugar, acidic, metallic, and bitter components are non-volatile and are combined in the flavor enhancing composition in the ranges of about 20% to 80% sugar, about 1% to 10% acidic, about 2% to 50% metallic, and about 1% to 80% bitter, by weight of the total dry solids present in the composition such that the combined components produce a composite flavor profile that resembles a fresh potato flavor without the flavor of any one of said components being dominant and with the flavor of each component being noticeable when the resulting flavor enhancing composition is used as a flavoring agent in a potato-based composition.

24. The composition according to claim 23 in which a proportionately lower amount of the bitter flavor component is included in the resulting composition as the amount of heating of the dry particulate potato solids increases.

25. The composition according to claim 23 in which the acidic component includes citric acid and malic acid and in which the citric acid is present in the range from about 2.5 parts to about 4 parts for one part of the malic acid.

26. The composition according to claim 23 in which the potato solids for the bitter flavor component are selected from the group consisting of dehydrated potato flakes, granules, dice, or slices.

27. A potato flavor enhancing composition consisting essentially of a sugar component, an acidic component provided by at least one acid naturally present in a potato, a metallic flavor component provided by at least one salt of a metal naturally present in a potato, and a bitter flavor component provided by potato solids in dry particulate form which have been heated in air to a temperature in excess of 250° F. and to a moisture content of about 5% or less to cause browning of the potato solids to the extent that a bitter flavor component is produced by the heated dry particulate potato solids; and in which the sugar, acidic, metallic, and bitter flavor components are combined in relative proportions in the flavor enhancing composition such that the resulting composition provides a composite flavor profile resembling a fresh potato flavor without the flavor of any one of the flavor components in the composition being dominant, and with the flavor of each component being noticeable when the resulting flavor enhancing composition is used as a flavoring agent in a potato-based composition.

28. The composition according to claim 27 in which the flavor components are present in the range of about 20% to 80% sugar, about 1% to 10% acidic, about 5% to 50% metallic, and about 1% to 40% bitter, by weight of the total dry solids present in the flavor enhancing composition.

29. The composition according to claim 27 in which the components are present in the range of about 20% to 60% sugar, about 1% to 10% acidic, about 2% to 20% metallic and about 20% to 80% bitter, by weight of the total dry solids present in the flavoring enhancing composition.

30. The composition according to claim 27 in which acidic flavor component is selected from the group consisting of citric acid and malic acid.

31. The composition according to claim 27 in which the metallic flavor component is provided by a potassium salt, a phosphorous salt, or mixtures thereof.

32. The composition according to claim 27 in which the sugar, acidic, and metallic flavor components are essentially non-volatile.

33. The composition according to claim 27 in which the sugar component comprises sucrose.

34. The composition according to claim 27 in which a proportionately lower amount of the bitter flavor component is included in the composition as the amount of heating of the potato solids increases.

35. The composition according to claim 27 including a salt component comprising sodium chloride.

36. The composition according to claim 27 including vanillin.

37. A potato flavor enhancing composition for being added to a potato-based composition to improve its flavor, wherein the potato-based composition can have an initial sugar level that varies from a relatively lower level up to a relatively higher level, the flavor enhancing composition comprising of a sugar component when the flavor enhancer is added in the presence of a relatively lower level of sugar in the potato-based composition, an acidic component provided by at least one acid naturally present in a potato, a metallic flavor component provided by at least one salt of a metal naturally present in a potato, and a bitter flavor component provided by potato solids in dry particulate form which have been heated in air at a sufficiently high temperature for a sufficient length of time to cause browning of the potato solids to the extent that a bitter flavor component is produced by the heated dry particulate potato solids; in which said flavor components are combined in relative proportions in the flavor enhancing composition such that the resulting flavor enhancing composition has a composite flavor profile that resembles a fresh potato flavor without the flavor of any one of said flavor components being dominant, and with the flavor of each component being noticeable when the resulting flavor enhancing composition is used as a flavoring agent in the potato-based composition.

38. The composition according to claim 37 in which the flavor enhancing composition consists essentially of a mixture of said components present in the range of 0% to 80% sugar, about 1% to 10% acidic, about 2% to 50% metallic, and about 1% to 80% bitter, by weight of the total solids.

39. A method for enhancing the flavor of a potato-based composition, wherein the potato-based composition can have an initial sugar level that varies from a relatively lower level up to a relatively higher level, comprising the steps of preparing a potato flavor enhancing composition comprising a sugar component when the flavor enhancer is added in the presence of a relatively lower level of sugar in the potato-based composition, an acidic component provided by at least one acid naturally present in a potato, a metallic flavor component provided by at least one salt of a metal naturally present in a potato, and a bitter flavor component provided by potato solids in dry particulate form which have been heated in air at a sufficiently high temperature for a sufficient length of time to cause browning of the potato solids to the extent that a bitter flavor component is produced by the heated dry particulate potato solids; and adding the flavor enhancing composition to the potato-based composition so that said flavor components are combined in relative proportions such that the resulting flavor enhancing composition provides a composite flavor profile that resembles a fresh potato flavor without the flavor of any one of said flavor components being dominant, and with the flavor of each component being noticeable in the potato-based composition.

40. The method according to claim 39 in which the flavor enhancing composition consists essentially of a mixture of said components present in the range of about 0% to 80% sugar, about 1% to 10% acidic, about 2% to 20% metallic, and about 1% to 80% bitter, by weight of the total solids present in the flavor enhancing composition.

41. The method according to claim 39 in which the flavor enhancing composition is added to the water of hydration used for reconstituting dehydrated potatoes.

42. A process for improving the flavor of an intermediate potato product, the method comprising: adding to the intermediate potato product a potato flavor enhancing composition comprising a sugar component, an acidic component provided by at least one acid naturally present in a potato, a metallic flavor component provided by at least one salt of a metal naturally present in a potato, and a bitter flavor component provided by potato solids in dry particulate form which have been heated in air at a sufficiently high temperature and for a sufficient length of time to cause browning of the potato solids to the extent that a bitter potato flavor component is produced by the heated dry particulate potato solids, each of the flavor components being non-volatile and being combined in relative proportions such that subsequent heating or frying of the intermediate potato product to form a finished product produces a composite flavor profile in the finished product that resembles a fresh potato flavor without the flavor of any one of said flavor components being dominant and with the flavor of each component being noticeable in the finished product.

43. The process according to claim 42 in which the components in the flavor enhancing composition are present in the intermediate product in the following ranges: about 17% to about 4% sugar, about 0.05% to 0.3% acidic, about 0.4% to 1.5% metallic, and about 0.1% to 5% bitter, by weight of the total dry solids present in the intermediate composition.

44. The method according to claim 42 in which the bitter component is produced by heating the potato solids to a temperature in excess of 250° F. and to a moisture content of about 5% or less.

45. The process according to claim 42 in which the acidic component includes citric acid and malic acid.

46. The method according to claim 42 in which the metallic component includes a potassium salt, a phosphorus salt, or mixtures thereof.

47. The process according to claim 42 in which the acidic component includes citric acid and malic acid; and in which the metallic component is provided by a potassium salt, a phosphorus salt, or mixtures thereof.

48. The process according to claim 47 in which the bitter component is produced by heating the potato solids to a temperature in excess of 250° F. and to a moisture content of about 5% or less.

49. The process according to claim 48 in which the sugar component includes sucrose.

50. A process for improving the flavor of an intermediate potato product which can have an initial sugar level that varies from a relatively lower level up to a relatively higher level, the method comprising adding to the intermediate potato product a potato flavor enhancing composition comprising a sugar component when the flavor enhancer is added in the presence of a relatively lower level of sugar in the intermediate potato product, an acidic component provided by at least one acid naturally present in a potato, a metallic flavor component provided by at least one salt of a metal naturally present in a potato, and a bitter flavor component provided by potato solids in dry particulate form which have been heated in air at a sufficiently high temperature and for a sufficient length of time to cause browning of the potato solids to the extent that a bitter potato flavor component is produced by the heated dry particulate potato solids, each of the flavor components being non-volatile and being combined in relative proportions such that subsequent heating or frying of the intermediate potato product to form a finished product produces a composite flavor profile in the finished product that resembles a fresh potato flavor without the flavor of any one of said flavor components being dominant and with the flavor of each component being noticeable in the finished product.

51. The process according to claim 50 in which the components in the flavor enhancing composition are present in the intermediate product in the following ranges: about 17% to about 4% sugar, about 0.05% to 0.3% acidic, about 0.4% to 1.5% metallic, and about 0.1% to 5% bitter, by weight of the total dry solids present in the intermediate composition.

52. The process according to claim 50 in which the bitter component is produced by heating the potato solids to a temperature in excess of 250° F. and to a moisture content of about 5% or less.

53. The process according to claim 50 in which the flavor enhancing composition is added to potatoes used to prepare dried mashed potatoes, before the potatoes are dehydrated.

54. The process according to claim 50 in which the flavor enhancing composition is added to a potato snack dough formulation before the dough is fried.

55. The process according to claim 50 in which the flavor enhancing composition is mixed with potato pieces before the pieces are fried.

56. The process according to claim 50 in which the flavor enhancing composition is added to the water of hydration for dehydrated potatoes.

57. The process according to claim 50 in which the flavor enhancing composition is added to fabricated potato shreds which are subsequently dried prior to later rehydration.

58. The process according to claim 50 in which the flavor enhancing composition is added to mashed potatoes which are dried, pulverized, and dry-blended with dry potato pieces.

59. The process according to claim 50 in which the flavor enhancing composition is added to mashed potatoes which are dried, pulverized, and added with water to dried potato pieces.

* * * * *